United States Patent
Enfantino

[11] 3,734,477
[45] May 22, 1973

[54] GUIDE FOR CUTTING TORCH

[76] Inventor: Nick Enfantino, 1723 Willon St., San Jose, Calif. 95125

[22] Filed: July 19, 1971

[21] Appl. No.: 163,768

[52] U.S. Cl. .................................266/23 M, 266/23 E
[51] Int. Cl. ................................................B23k 7/10
[58] Field of Search .................266/23 R, 23 T, 23 M, 266/23 B, 23 E; 239/288, 288.3, 288.5, 516

[56] References Cited

UNITED STATES PATENTS

| | | | |
|---|---|---|---|
| 80,568 | 8/1868 | Scholl | 239/516 |
| 612,433 | 10/1898 | Orford | 239/516 |
| 2,224,242 | 12/1940 | Young | 266/23 M |
| 2,337,087 | 12/1943 | Deck | 266/23 R |
| 2,465,978 | 3/1949 | Meincke | 266/23 M |

FOREIGN PATENTS OR APPLICATIONS 886,919   1/1962   Great Britain .....................266/23 R

*Primary Examiner*—Gerald A. Dost
*Attorney*—Clarence A. O'Brien and Harvey B. Jacobson

[57] ABSTRACT

A readily applicable and removable supporting and steadying guide for use on the flame emitting tip of a manually manipulatable cutting torch. The torch and tip are conventional. The guide comprises a split expansible and contractible brass or equivalent collar herein defined as an adapter and whose lower edge is provided with a pair of diametrically opposite depending selectively usable legs for supportively elevating, gauging and steadying the height of the flame tip. These legs are circumferentially separated by diametrically opposite clearance notches.

2 Claims, 6 Drawing Figures

PATENTED MAY 22 1973  3,734,477
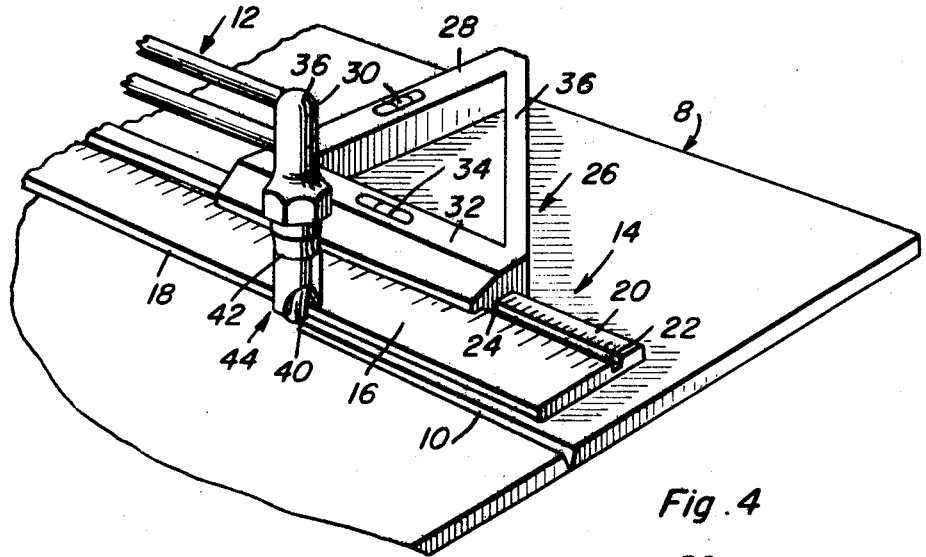
Fig. 1
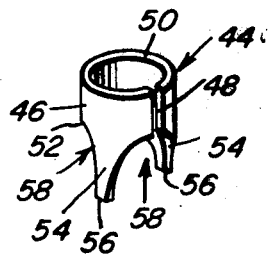
Fig. 2
Fig. 3
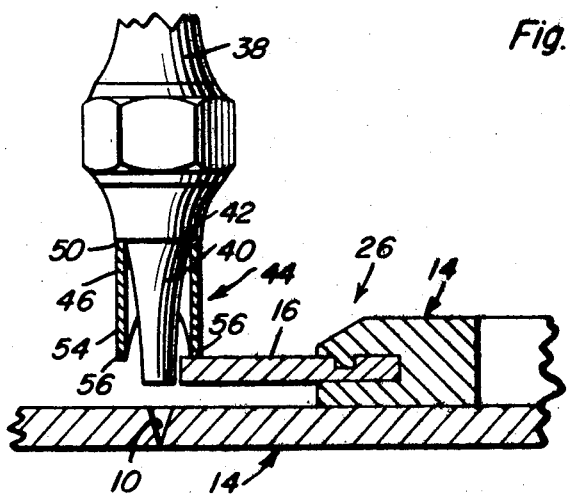
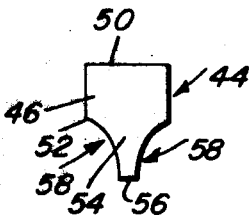
Fig. 4
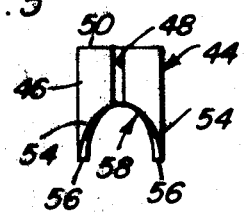
Fig. 5
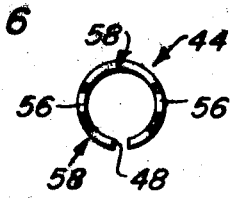
Fig. 6
Nick Enfantino
INVENTOR
BY *Thomas A. O'Brien*
and *Harvey B. Jackson*
Attorneys

GUIDE FOR CUTTING TORCH

This invention relates to supporting, elevating height-gauging and steadying means which is attachable to the flame tip on a sheet material cutting torch and has to do, more particularly, with an adapter collar provided with depending leg means which is capable of resting atop and slid along the ruler part of a manually controllable square.

For background purposes it should be helpful here to mention that cutting torch guides which are attachable and detachable and which function to supportively elevate the flame tip of a torch are admittedly old. Although several typical reference patents could be mentioned, it will suffice, it is submitted, to cite the torch cutting guide attachment disclosed in a U.S. Pat. issued to Wilbur L. Root, No. 3,139,471 and a broadly analogous welding-type guide revealed in the John M. Halbing U.S. Pat. No., 2,125,916. Consideration of these reference patents and a comparison of the same with the herein disclosed adaptation will enable the reader to ascertain, generally stated, the state of the art to which the invention pertains.

Briefly the invention herein set forth has to do with a readily applicable and removable guide, that is, a guide which is designed and adapted for attachment to the flame emitting tip of a manually manipulatable sheet material cutting torch. This guide, more specifically, comprises a split annular expansible and contractible band. The band is resilient and constitutes an adapter collar. The collar has an upper edge which is adapted to abut a relatively stationary limit stop shoulder. It also has a lower edge provided with a pair of like depending legs. These legs are diametrically opposite each other and have free lower end portions which are appropriately shaped and are capable of resting atop the planar surface of a calibrated ruler-like straight edge, that is, a ruler wherein one edge provides the straight edge and the other portion is provided with handling means, the overall implement constituting a hand-held square.

More specifically the legs are gradually decreased in width and are therefore tapered downwardly from their widened upper ends to their lower free ends. Then, too, these legs are preferably diametrically opposite each other. To the ends desired the legs are circumferentially spaced by intervening clearance notches, these notches being diametrically opposite each other. Provision of the notches between the gauge-like legs facilitates unobstructedly viewing the end of the tip and the flame which is emitted from the tip.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a fragmentary portion of a sheet metal or an equivalent plate which is being acted upon and showing, what is more significant, the headed end of the cutting torch, the flame emitting tip and the guide collar attached to and cooperable with the tip.

FIG. 2 is a view in perspective of the guide by itself.

FIG. 3 is an enlarged view with parts in section and elevation and showing the aforementioned shoulder, the flame tip, and the surrounding guide with one leg thereof resting slidingly atop the ruler part of the aforementioned square.

FIG. 4 is a view in side elevation of the guide.

FIG. 5 is a similar view at right angles to FIG. 4 and showing the slit side of the adapter collar.

FIG. 6 is a bottom plan view of the guide.

With reference to FIG. 1 the numeral 8 designates the sheet of material which is to be acted upon and which is shown provided with a lengthwise cut 10.

The implement with which the cutting torch 12 is customarily used is denoted, generally stated, by the numeral 14. This implement is shown only in FIG. 1 and is of a conventional type and constitutes what is generally designated in the trade as a hand-held and manipulatable square. One part or component thereof is denoted at 16 and constitutes a flat-faced ruler. The straight edge along one edge is denoted at 18, the other edge portion 20 being provided with groove means 22 in which a key 24 of the handling means 26 is cooperable. The handling means comprises a triangular frame wherein one leg 28 is provided with a spirit level 30 and which is connected with a second leg 32 provided with a spirit level 34. The third and connecting leg is denoted at 36. This implement 14, being of a generally wellknown type, is shown to bring out the manner in which the cutting torch 12 can be effectually used. There has long existed means for elevating, supporting and shiftably guiding the headed end 36 of the torch. It will be appreciated that since the torch is held in one hand and the implement 14 is held and used in the other hand, it is difficult to maintain the desired height and cutting line of the torch, that is, the flame-emitting tip 40 for the torch. The submitted invention comprises a readily applicable and removable attachment for the flame tip and cooperates with the existing limit stop shoulder 42 in the manner best shown in FIG. 3.

The invention can be described as an attachment, or, alternatively, as a readily applicable and removable guide for the flame-emitting tip. It comprises a split annular expansible and contractible band 44 which is preferably but not necessarily made of brass or an equivalent durable but resilient material. The band is ring-like and constitutes an adapter collar which is denoted at 46, said collar being slit as at 48 on one side. Thus the collar constitutes an expansible and contractible split adapter. The upper edge 50 when in use abuts the aforementioned shoulder 42 in the manner illustrated in FIG. 3. The lower edge portion 52 (FIG. 2) is of special construction. The collar in actual practice is sleeved and fitted retentively over the flame tip 40 in a manner to engage the shoulder 42 as illustrated in FIG. 3. It is of such length that the gauge means on the lower edge functions properly to achieve the elevating, steadying and gliding result desired. For best results it has been found that the lower edge portion can be provided with leg means. While it would be permissible to use a single leg it has been found more satisfactory to employ a pair of duplicate depending elevating and guiding legs which constitute gauges. These legs being alike are denoted by the numeral 54 and the upper widened portion of each leg is joined with the lower edge 52 and the body portion tapers downwardly and terminates in a flat or substantially flat terminal 56 which can be slidably seated atop the surface 16.

In addition to the downwardly tapering duplicate diametrically opposite gauge-like legs 54 the lower portion, that is, the part below the edge 52 is provided with a pair of diametrically opposite inverted U-shaped clearance notches 58. These notches serve not only to define the paired legs 54, they are advantageous in that they provide sight openings which come into play when the torch is being used in conjunction with the implement 14 as brought out in FIG. 1. This is to say the notches expose the lower flame-emitting end of the flame tip and make it easier for the user to accurately gauge the movement of the cutting torch and, more particularly, the guide collar thereon.

Experience has shown that the guide is simple, practical, inexpensive and well serves the purposes for which it has been devised and satisfactorily used. The guide itself is clearly brought out in FIGS. 2, 4, 5 and 6 and the manner in which it is associated with the head 36 and, more particularly, the flame tip 40 is aptly shown in FIGS. 1 and 3.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A readily applicable and removable guide for the flame emitting tip of a manually manipulatable sheet material cutting torch comprising a one-piece split annular expansible and contractible band, said band being resilient, self-clamping and constituting an adapter collar, said collar having upper and lower edges, said upper edge being disposed at right angles to the axis of said collar and structurally capable of firmly abutting an annular stop shoulder, said lower edge being provided with a pair of depending gauging legs, said legs structurally alike, diametrically opposite each other, and having blunt surface contacting lower ends capable of resting firmly atop and progressively and shiftably slid along the planar surface of the calibrated ruler-like straight edge of a hand-held square, said legs being gradually decreased in width and tapered downwardly from their upper to their lower ends.

2. The guide defined in and according to claim 1, and wherein said legs are circumferentially spaced by intervening inverted, U-shaped flame viewing notches, said notches being diametrically opposite each other.

* * * * *